(12) United States Patent
Lim et al.

(10) Patent No.: US 10,531,308 B1
(45) Date of Patent: Jan. 7, 2020

(54) DYNAMICALLY ASSIGNING PRIORITY FOR SHARED SPECTRUM COMMUNICATION SYSTEMS

(71) Applicant: MOTOROLA SOLUTIONS, INC., Chicago, IL (US)

(72) Inventors: Bing Qin Lim, Pulau Pinang (MY); Guo Dong Gan, Kuala Lumpur (MY); Chun Meng Tan, Penang (MY); Woei Chyuan Tan, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/128,871

(22) Filed: Sep. 12, 2018

(51) Int. Cl.
*H04W 16/14* (2009.01)
*H04W 72/10* (2009.01)

(52) U.S. Cl.
CPC .......... *H04W 16/14* (2013.01); *H04W 72/10* (2013.01)

(58) Field of Classification Search
CPC ............................. H04W 16/14; H04W 72/10
See application file for complete search history.

(56) References Cited

U.S. PATENT DOCUMENTS

| | | | |
|---|---|---|---|
| 2002/0087716 A1 | 7/2002 | Mustafa | |
| 2013/0337749 A1* | 12/2013 | Wang | H04W 4/80 455/41.2 |
| 2014/0237547 A1 | 8/2014 | Bose | |
| 2015/0050943 A1* | 2/2015 | Uusitalo | H04W 16/14 455/454 |
| 2015/0133079 A1* | 5/2015 | Smith | H04W 16/14 455/406 |
| 2015/0245374 A1* | 8/2015 | Mitola, III | G06Q 30/08 370/329 |
| 2015/0264544 A1* | 9/2015 | Lu | H04W 4/21 455/414.1 |
| 2017/0048054 A1 | 2/2017 | Tsuda et al. | |
| 2017/0135095 A1* | 5/2017 | Chandwani | H04W 72/0446 |

(Continued)

OTHER PUBLICATIONS

International Search Report and Written Opinion dated Oct. 29, 2019 for related International Application No. PCT/US2019/047327.

*Primary Examiner* — Brian D Nguyen
(74) *Attorney, Agent, or Firm* — Michael Best & Friedrich LLP

(57) ABSTRACT

Systems and methods for dynamically assigning priority for shared spectrum communication systems. One method includes receiving, via a communication interface of a base station, a call request from a first communication device identifying a second communication device and a first spectrum priority level for the first communication device. The method includes establishing a call, having the first priority level, between the first and second communication devices. The method includes determining a second spectrum priority level for the second communication device, and, when the second priority level is lower than the first priority level, transmitting, to a spectrum manager, a priority assignment request to assign the first priority level to the second communication device after the call is terminated. The method includes, when a priority expiration threshold has been met, transmitting a second priority assignment request to the spectrum manager to assign the second priority level to the second communication device.

20 Claims, 3 Drawing Sheets

(56) References Cited

U.S. PATENT DOCUMENTS

2017/0311167 A1* 10/2017 Sun .................. H04W 16/10
2018/0103379 A1    4/2018 Smith et al.
2018/0132111 A1    5/2018 Mueck et al.

* cited by examiner

DYNAMICALLY ASSIGNING PRIORITY FOR SHARED SPECTRUM COMMUNICATION SYSTEMS

BACKGROUND OF THE INVENTION

Radio frequency spectrum allocated for wireless communications is a limited resource. Some of the available spectrum is assigned to different users and communication modes. Other portions of the available spectrum are shared and allocated dynamically among users, allowing systems to increase capacity as-needed, for example, the Citizens Broadband Radio Service (CBRS). CBRS systems dynamically allocate spectrum to LTE systems in the 3.5 GHz band based on, among other things, user's priority.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
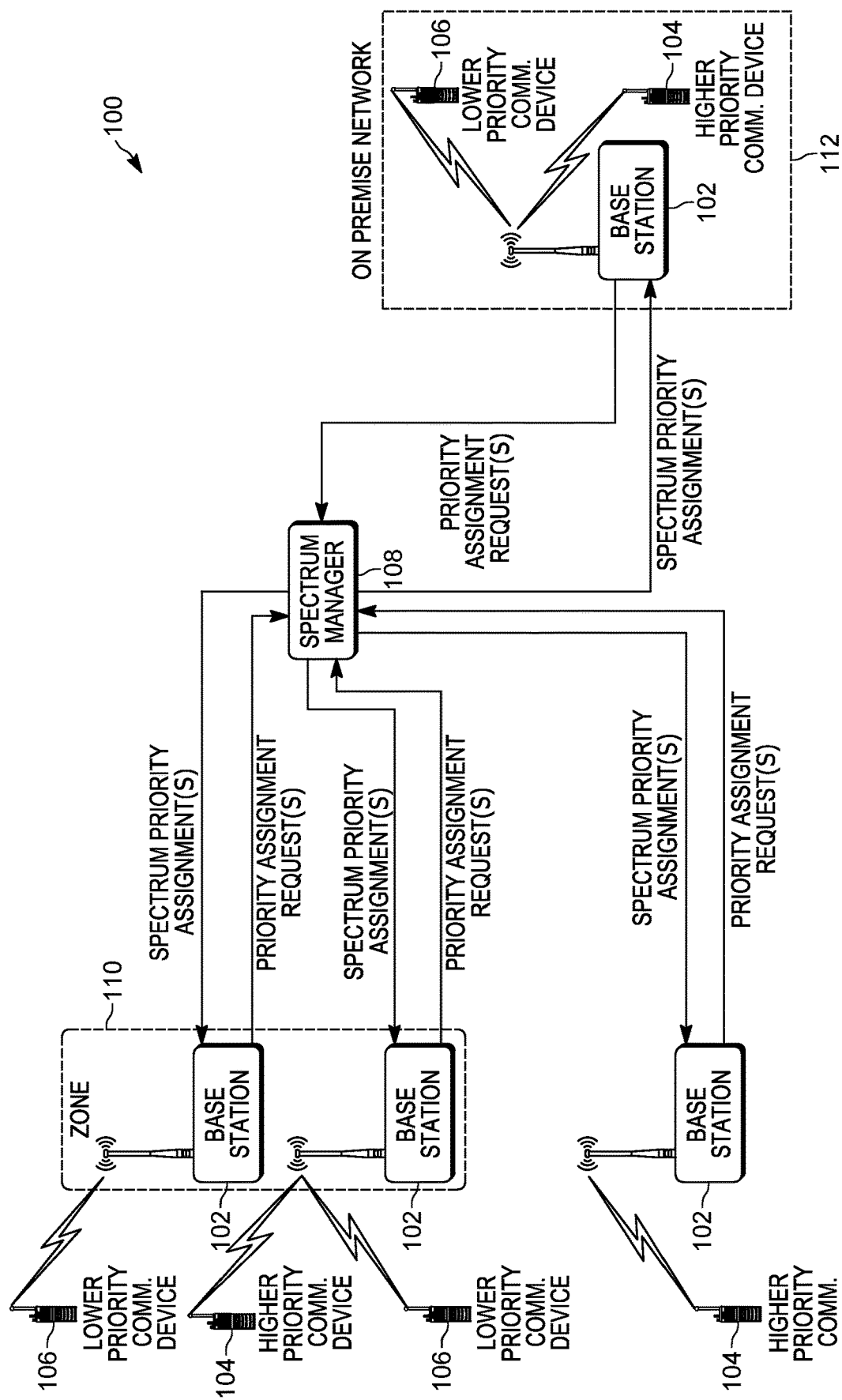
FIG. 1 is a diagram of a communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Citizens Broadband Radio Service (CBRS) systems include a Spectrum Access System (SAS), which dynamically allocates spectrum in the 3.5 GHz band to base stations based on, among other things, user's priority. It should be noted that, in the description that follows, the terms "higher" and "lower" are used to distinguish, in a general way, between different spectrum priority levels used to assign radiofrequency spectrum to users in a shared spectrum communication system, for example, a CBRS system. The terms, however, are not meant to imply that any of the spectrum priority levels so labeled is superior or inferior. Nor are the terms meant to imply that no other spectrum priority levels could be considered "higher" or "lower" than the spectrum priority levels so labeled. Nonetheless, the "higher" spectrum priority levels provide a relatively higher priority for system users assigned spectrum based on those levels, relative to users assigned spectrum based on the "lower" spectrum priority levels. The converse is also true, "lower" spectrum priority levels provide a relatively lower priority for system users assigned spectrum based on those levels, relative to users assigned spectrum based on the "higher" spectrum priority levels.

In a CBRS system, incumbent users (for example, military users) have the highest priority. Priority Access License (PAL) users have a lower priority than incumbent users, but a higher priority than General Authorized Access (GAA) users. GAA users are permitted to use any portion of the band not assigned to a higher priority user, but may also operate opportunistically on unused PAL channels. Priority may also be based on geography. For example, areas near incumbent users may be designated as exclusion zones, where no other users are allowed to operate. In some instances, an exclusion zone may be designated a protection zone, where spectrum is allocated so long as an incumbent user is not currently operating. For example, an exclusion zone may be established along a shoreline because the incumbent user uses the spectrum for naval radar. When ships are not present in such an exclusion zone, the exclusion zone is designated a protection zone.

The SAS allocates spectrum to all spectrum priority levels, but may revoke an allocation to a lower priority user. For example, the SAS may reallocate spectrum that is previously allocated to lower priority user to a higher priority user and vice versa. In another example, the SAS may stop a lower priority user from transmitting when a transmission from an incumbent user is detected (changing a protection zone back to an exclusion zone). As a consequence, in some instances, a higher priority user is able to make calls at its higher spectrum priority level to a lower priority user, but the lower priority user is not able to call back at the higher spectrum priority level (for example, because higher priority users are using the spectrum). In some cases, this may inhibit users' operations, because the higher priority user is able to contact the lower priority user, for example, to make a request. However, the higher priority user may not receive a timely response to the request from the lower priority user. The lower priority user may be unable to make a call back to the higher priority user. For example, a public safety officer responding to an incident may contact a private security guard for information that would help her response. However, due to the priority disparity, the private security guard may not be able to place a call back to the public safety officer with the information. It should be noted that the term "call," as used herein, may refer to a voice call, a video call, a data transmission, a push-to-talk (PTT) transmission, or another form of communication between two or more wireless communication devices using the shared spectrum.

Accordingly, systems and methods are provided herein for, among other things, for dynamically assigning priority for shared spectrum communication systems. Embodiments provided herein include base stations and spectrum managers, which temporarily assign higher spectrum priority levels to called users, based on the calling user's spectrum priority level. Using such embodiments, when a higher priority user communicates with a lower priority user, the lower priority user is temporarily assigned the same spectrum priority level as the higher priority user. In the example described above, the private security guard is temporarily assigned the same spectrum priority level as the public safety officer who called him. Thus, when the security guard attempts to place a call back to the public safety officer, the call is more likely to go through.

Embodiments presented herein also provide for temporary priority assignment propagation. For example, when a second user with a temporarily-assigned higher spectrum priority level calls another third user with a lower spectrum priority level, that third user is also temporarily assigned the higher spectrum priority level. Some embodiments temporarily assign the caller's higher spectrum priority level to the called user, along with other users related to the called user. For example, all devices registered to the called user's base station may be assigned the higher spectrum priority level. In another example, when the called user's base station is part of a zone, all base stations in that zone are assigned the higher spectrum priority level. In another example, when a called user is participating in an on-premise private network, the on-premise private network (and, therefore, all devices participating in the network) is temporarily assigned the higher spectrum priority level.

Using such embodiments, higher priority users can receive responsive communications more quickly. Embodiments described herein therefore result in more efficient use of shared spectrum communication system resources and improved operation of the communication systems for users, such as public safety personnel.

One example embodiment provides a system for dynamically assigning priority for shared spectrum communication systems. The system includes a base station configured to be communicatively coupled to a communication network. The base station includes a communication interface and an electronic processor. The electronic processor is configured to receive, via the communication interface, a first call request from a first communication device, the first call request identifying a second communication device and a first spectrum priority level for the first communication device. The electronic processor is configured to establish a first call, having the first spectrum priority level, between the first communication device and the second communication device. The electronic processor is configured to determine a second spectrum priority level for the second communication device. The electronic processor is configured to, when the second spectrum priority level is lower than the first spectrum priority level, transmit, to a spectrum manager configured to assign spectrum priority levels to the base station, a priority assignment request to assign the first spectrum priority level to the second communication device after the first call is terminated. The electronic processor is configured to, when a priority expiration threshold for the second communication device has been met, transmit a second priority assignment request to the spectrum manager to assign the second spectrum priority level to the second communication device Another example embodiment provides a method for dynamically assigning priority for shared spectrum communication systems. The method includes receiving, via a communication interface of a base station communicatively coupled to a communication network, a first call request from a first communication device, the first call request identifying a second communication device and a first spectrum priority level for the first communication device. The method includes establishing a first call, having the first spectrum priority level, between the first communication device and the second communication device. The method includes determining, with an electronic processor, a second spectrum priority level for the second communication device. The method includes, when the second spectrum priority level is lower than the first spectrum priority level, transmitting, to a spectrum manager configured to assign spectrum priority levels to the base station, a priority assignment request to assign the first spectrum priority level to the second communication device after the first call is terminated. The method includes, when a priority expiration threshold for the second communication device has been met, transmitting a second priority assignment request to the spectrum manager to assign the second spectrum priority level to the second communication device.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 illustrates an example communication system 100. The communication system 100 includes base stations 102, higher priority communication devices 104, lower priority communication devices 106, and a spectrum manager 108. The illustrated components are communicatively coupled to one or more communications networks. An example communications network is illustrated in FIG. 2 and described below.

Figure 2:
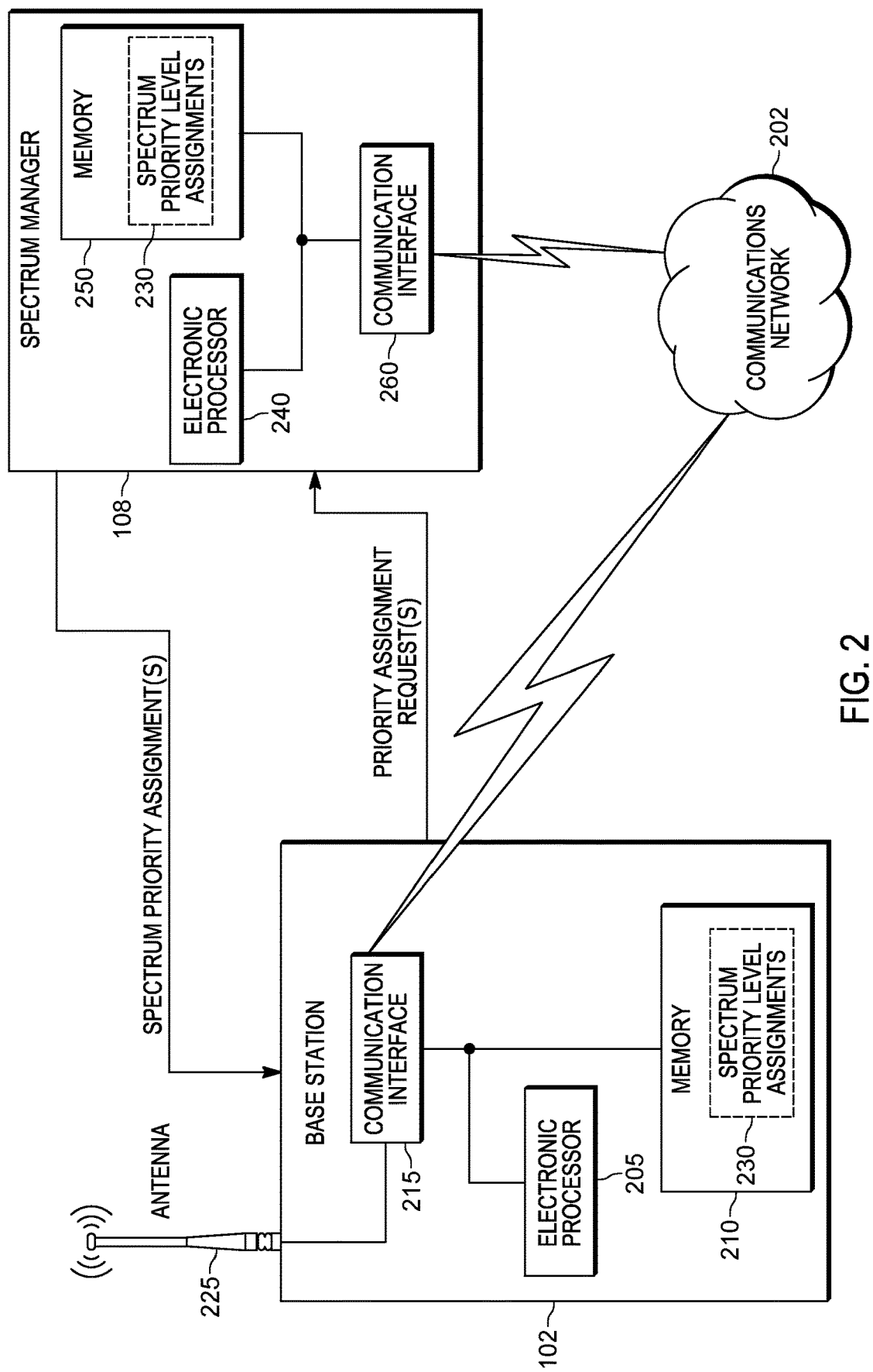
FIG. 2 is a diagram of a server included in the communication system of FIG. 1, in accordance with some embodiments.

The base stations 102, described more particularly below with respect to FIG. 2, are part of a wireless communication network infrastructure, which provides wireless communications between wireless communication devices (for example, the higher priority communication devices 104 and the lower priority communication devices 106). In some embodiments, the higher priority communication devices 104 and the lower priority communication devices 106 are smart telephones. In other embodiments, each of the higher priority communication devices 104 and the lower priority communication devices 106 may be one of a smart telephone, a portable two-way radio, a converged device (incorporating elements of a smart telephone and a portable two-way radio), a tablet computer, or may be another type of portable or mobile electronic device containing software and hardware enabling it to operate as described herein. In some embodiments, one or more of the base stations 102 are a long-term evolution (LTE) Evolved Node B (eNodeB) or CBRS eNodeB.

The base stations 102 operate to provide communications to and from the higher priority communication devices 104 and the lower priority communication devices 106 using dynamically-allocated radiofrequency spectrum. The base stations 102 assign communication channels to the higher priority communication devices 104 and the lower priority communication devices 106 based on spectrum assignments. The spectrum assignments are requested by the base stations 102 and granted by the spectrum manager 108 (described in detail below with respect to FIG. 2). As illustrated in FIG. 1, the base stations 102 send priority assignment requests to the spectrum manager 108. As described herein, in some embodiments, the priority assignment requests include requests for shared spectrum allocations and requests to change the spectrum priority level of base stations 102, wireless communication devices in communication with the base stations 102, or combinations of both. In some embodiments, the base stations operate according to the Citizens Broadband Radio Service (CBRS) standard developed by the Wireless Innovation Forum (WInnForum). In such embodiments, the spectrum manager 108 is or includes a CBRS Spectrum Access System (SAS).

As noted, the communication system 100 operates using shared radiofrequency spectrum, which is assigned by the spectrum manager 108 based on spectrum priority levels. The higher priority communication devices 104 have a relatively higher spectrum priority level than the lower priority communication devices 106. The spectrum priority level of a communications device is based on, among other things, a user of the communication device, or an agency or organization operating the communication device. For example, in a CBRS system communication devices operated by incumbent users (for example, government and military users, satellite users, and the like) have the highest spectrum priority level. Communication devices operated by Priority Access License (PAL) users have a lower priority than incumbent users, but a higher priority than General Authorized Access (GAA) users. PAL users have been assigned particular portions of the CBRS band to use in particular geographic areas. GAA users are permitted to use any portion of the band not assigned to a higher priority user, but may also operate opportunistically on unused PAL channels. Spectrum priority levels may be assigned to individual communication devices, or to base stations 102. In some embodiments, when a spectrum priority level is assigned to a base station, it is therefore assigned to all of the communication devices that connect to the base station. Although embodiments are described herein in terms of a CBRS shared spectrum system, this is by way of example only. It should be noted that the embodiments presented may be used with priority-based shared spectrum systems operating according to other standards.

In some embodiments, some base stations 102 of the system 100 are organized into zones, for example, the zone 110 illustrated in FIG. 1. Base stations are organized by zones based on, among other things, geographic proximity, association with a particular wireless carrier, association with a particular organization (for example, a public safety agency), the presence of the base stations within an exclusion zone or a protection zone, and the like. In some embodiments, a base station 102 operates to provide service in an on-premise network 112. For example, a residential apartment complex or an office building may provide a wireless communications network for its occupants and guests. Such on-premise networks may include wireless communication devices (for example, higher priority communication devices 104 and lower priority communication devices 106), wireless (for example, Wi-Fi) access points, Internet of Things (IoT) enabled "smart" devices, computing systems, and the like.

Although several of the higher priority communication devices 104 and lower priority communication devices 106 are illustrated in FIG. 1 as communicating through several of the base stations 102, this is by way of example only. The communication devices are mobile, and may communicate using different base stations as they are moved about.

FIG. 2 schematically illustrates an example base station 102 and an example spectrum manager 108 in more detail. The base station 102 and the spectrum manager 108 are communicatively coupled via a communications network 202. The communications network 202 may include a wide area network (WAN) (for example, a transport control protocol/internet protocol (TCP/IP)-based network), a local area network (for example, a Wi-Fi or Ethernet network), a cellular network, such as, for example, a Long-Term Evolution (LTE) network, and combinations or derivatives thereof.

In the embodiment illustrated, the base station 102 includes an electronic processor 205, a memory 210, a communication interface 215, and an antenna 225. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 205 may include one or more microprocessors, an application-specific integrated circuit (ASIC), or another suitable electronic device. The electronic processor 205 is configured to obtain and provide information (for example, from the memory 210 and/or the communication interface 215), and process the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein. The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, spectrum priority level assignments 230 for the higher priority communication devices 104, the lower priority communication devices 106, and the base stations 102.

The communication interface 215 is configured to receive input and to provide system output. The communication interface 215 includes hardware for communicating over one or more wired or wireless communication networks or connections with, for example, the spectrum manager 108. For example, in some embodiments, the communication interface 215 includes a transceiver. In some embodiments, the transceiver is a combined transmitter-receiver component. In other embodiments, the transceiver includes separate transmitter and receiver components. The electronic processor 205 is configured to control the communication interface 215 to transmit and receive digital radio signals to and from, for example the higher priority communication devices 104 and the lower priority communication devices 106 using the antenna 225. The electronic processor 205 and the communication interface 215 may include various digital and analog components, which for brevity are not described herein and which may be implemented in hardware, software, or a combination of both.

In the example provided, the spectrum manager 108 includes an electronic processor 240, a memory 250, and a communication interface 260. The electronic processor 240, the memory 250, and the communication interface 260 communicate over one or more communication lines or buses, wirelessly, or a combination thereof. These components are similar to those described above with respect to the base station 102, and perform similar functions. For example, the electronic processor 240 executes instructions stored in the memory 250 to implement functionality of the spectrum manager 108, such as to control the communication interface 260 to transmit and receive spectrum priority assignments and priority assignment requests to and from the base station 102.

As noted, shared spectrum systems (for example, the system 100) assign channels to base stations and communication devices from a spectrum pool available to many users and systems, based on, in part, priority. In some cases, higher priority users may need to communicate with lower priority users regarding urgent or otherwise important matters. For example, to respond to an incident (for example, a medical emergency, a natural disaster, a fire, a crime in progress, a missing person, tracking a suspect, and the like), a public safety user with a Priority Access License (PAL) may need to obtain information from one or more users having General Authorized Access (GAA). The public safety user, having a higher priority, will likely be able to access a base station to place the initial call to the lower priority user(s) requesting the information. However, the lower priority user(s) may not be able to respond in a timely fashion, owing to their lower priority on the communication system. This results in the public safety user not having the information he or she needs. It may also result in the public safety user having to make additional calls to request the information, which wastes time and system resources. This inhibits the ability of the public safety user to respond to the incident. A lower priority is more likely to prevent a timely response as communication system use increases, for example, during a larger scale incident, in which many responders, participants, and bystanders attempt to communicate regarding the incident.

Figure 3:
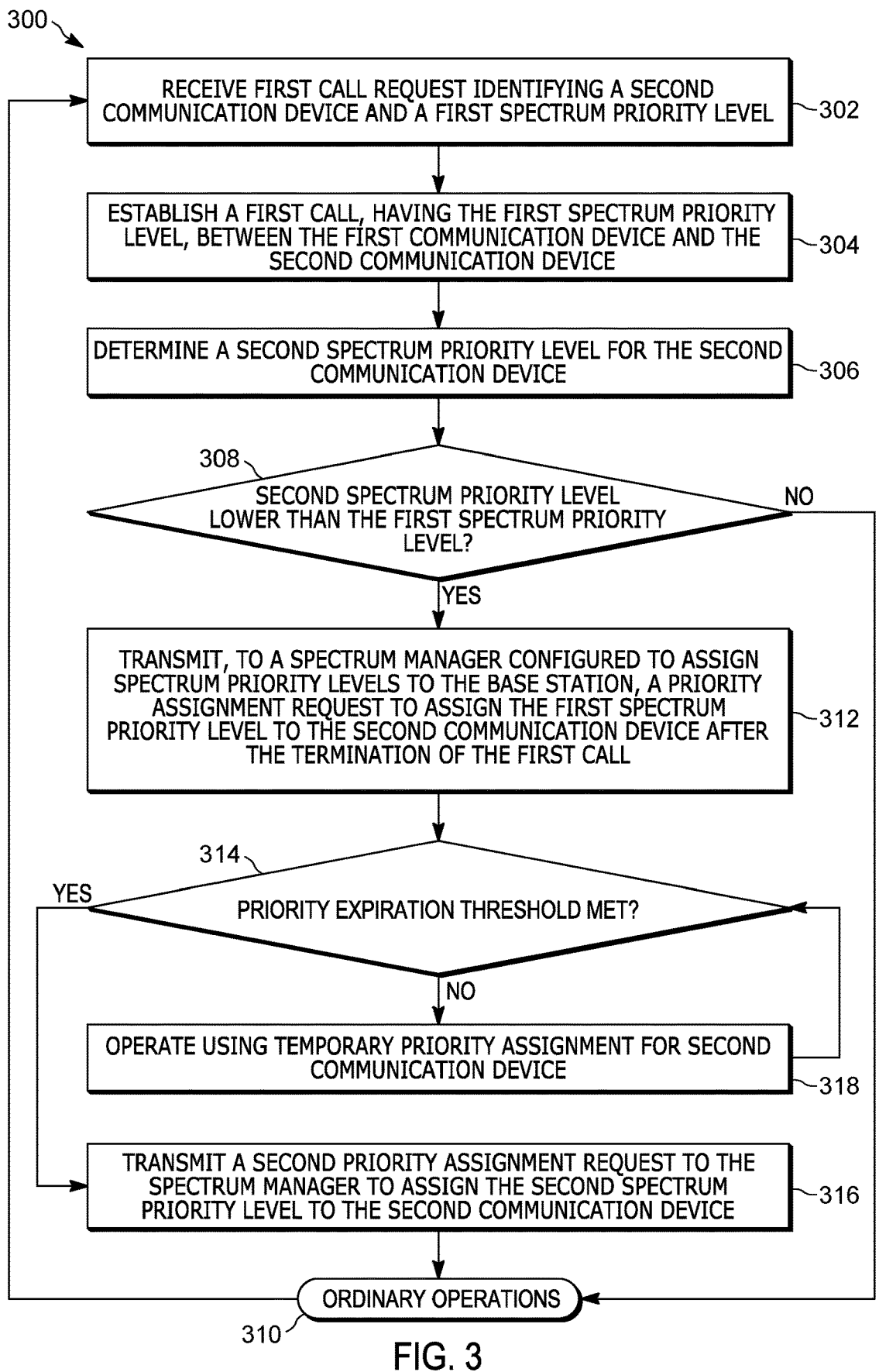
FIG. 3 is a flowchart of a method for dynamically assigning priority for shared spectrum communication systems, in accordance with some embodiments.

Accordingly, FIG. 3 illustrates a method 300 for dynamically assigning priority for shared spectrum communication systems. The method 300 is described as being performed by one of the base stations 102 and, in particular, the electronic processor 205. However, it should be understood that in some embodiments, portions of the method 300 may be performed by other devices, including for example, the spectrum manager 108. While FIG. 1 illustrates four base stations 102, three higher priority communication devices 104, and three lower priority communication devices 106 it should be understood that embodiments of the method 300 may be used to dynamically assign spectrum priority for more or fewer base stations and communication devices than illustrated. Embodiments may also include more than one spectrum manager.

As illustrated in FIG. 3, at block 302, the electronic processor 205 receives, via the communication interface 215, a first call request from a first communication device, the first call request identifying a second communication device and a first spectrum priority level for the first communication device. The first spectrum priority level indicates the priority of the first communication device, as described above (for example, an incumbent access priority level, a priority access license level, a general authorized access level, and the like). In some embodiments, a higher priority communication device 104 sends a call request (for example, digital message) to a base station 102, requesting a call with a lower priority communication device 106. As in the example set forth above, a public safety user may place a voice phone call to a security guard seeking information about an incident. In some embodiments, the digital message includes a header containing the spectrum priority level. In other embodiments, the spectrum priority level is included in the body of the digital message, or is known previously to the base station, for example, in a database of registered communication devices stored in the memory 210.

At block 304, the electronic processor 205, in response to the request, establishes a first call, having the first spectrum priority level, between the first communication device and the second communication device.

At block 306, the electronic processor 205 determines a second spectrum priority level for the second communication device. In some embodiments, the spectrum priority level is contained in a header or body of a call accept message received from the second communication device during call setup. In other embodiments, the electronic processor 205 may determine the second spectrum priority level by retrieving the information from a database.

As noted above, when a disparity exists between the spectrum priority levels for two communication devices, it may inhibit the ability of the communication device with the lower priority to contact the device with the higher priority, for example, inhibit the initiation of a call to the device with higher priority ten minutes after the first call is terminated. However, when both devices are operating at the same priority level, this may not be the case. As a consequence, at block 308, when the second spectrum priority level is not lower than the first spectrum priority level, the electronic processor 205 continues ordinary operations (at block 310), establishing calls between the devices based on their existing spectrum priority levels. However, at block 308, when the second spectrum priority level is lower than the first spectrum priority level, the electronic processor 205 transmits (at block 312), a priority assignment request to the spectrum manager 108. The priority assignment request is a request to assign the first spectrum priority level to the second communication device after the termination of the first call. In some embodiments, the base station 102 makes the assignment to the second communication device, and the priority assignment request informs the spectrum manager 108 of the assignment.

In some embodiments, the higher priority assignment level is assigned to more than the second communication device. For example, in some embodiments, when the second communication device is communicatively coupled to one of a plurality of base stations located within a zone, the priority assignment request includes a request to assign the first spectrum priority level to the plurality of base stations. In another example, when the second communication device is participating in an on-premise network, the priority assignment request includes a request to assign the first spectrum priority level to the on-premise network.

In some embodiments, the priority assignment request includes a request to assign the first spectrum priority level to an on-premise network, a base station, or a plurality of base stations is based on the quantity of called communication devices. For example, a call request may include a PTT voice transmission to a talkgroup containing multiple devices. In another example, a data request may be sent to multiple IoT devices to request data, sensor values, video streams, and the like. In such embodiments, when a call request includes multiple called communication devices, the priority assignment request includes a request to assign the first spectrum priority level to one or more base stations or on-premise networks associated with the multiple called communication devices. In some embodiments, when the call request includes only one called communication device, the priority assignment request will be made only for that called communication device, and not for its associated base station or on-premise network.

As noted, the assignment of a higher spectrum priority level to the second communication device is temporary. In some embodiments, the higher spectrum priority level assignment lasts until a priority expiration threshold has been met. Accordingly, at block 314, when a priority expiration threshold for the second communication device has been met (that is, the temporary assignment of a higher spectrum priority level to the second communication device has expired), the electronic processor 205 transmits a second priority assignment request to the spectrum manager to assign the second spectrum priority level to the second communication device (at block 316), returning the second communication device to its previously-assigned lower spectrum priority level. In some embodiments, the base station 102 makes the assignment to the second communication device, and the second priority assignment request informs the spectrum manager 108 of the assignment.

As long as, at block 314, the priority expiration threshold for the second communication device has not been met, the second communication device will be able to place calls at the temporarily-assigned first (higher) spectrum priority level. For example, the electronic processor 205 may receive a second call request from the second communication device identifying the first spectrum priority level for the second communication device. Because the priority threshold has not been met, the call request is granted and the electronic processor 205 establishes a second call based on the second call request and the first spectrum priority level. For example, the call request may be to place a return call to the first communication device at the first spectrum priority level.

In some embodiments, the electronic processor 205 determines that the priority expiration threshold for the second communication device has been met when a call placed by the second communication device at the higher spectrum priority level is terminated (that is, the temporary higher priority assignment lasts until the called user returns a call to the calling user). In some embodiments, the electronic processor 205 determines that the priority expiration threshold for the second communication device has been met when a priority hold timer has expired. For example, the higher spectrum priority level may expire after a short time (for example, 15-30 minutes), allowing time for the lower priority users to respond, while increasing the availability of spectrum for other users. In some embodiments, the higher level expires after the priority hold timer expires or the return call is completed, whichever occurs sooner.

In some embodiments, for example, when used in public safety environments, the call request may correspond to an incident, which is tracked via a computer aided dispatch (CAD) system. For example, a public safety officer is assigned by the CAD system to perform a rescue operation and any call request initiated by the public safety officer will be tracked by the CAD system and is considered to correspond to the rescue operation. In such embodiments, the electronic processor 205 determines that the priority expiration threshold for the second communication device has been met when a notification relating to the incident is received from the computer aided dispatch (CAD) system. For example, the notification may indicate that the incident has been completed (for example, a missing person has been located or a rescue operation has ended).

In some embodiments, the electronic processor 205 automatically determines when the priority expiration threshold for the second communication device has been met. In some embodiments, the electronic processor 205 is configured to analyze the calls placed between communication devices using natural language processing. In such embodiments, the electronic processor 205 determines the conversation content of the first call using natural language processing. For example, the electronic processor 205 may extract keywords from the conversation that correspond to a request for service or an incident. In one example, the electronic processor 205 identifies a task request in the conversation content, and determines that the priority expiration threshold for the second communication device has been met when the task request has been completed. For example, the task request may be a request by a public safety officer to determine whether a particular person is present at a particular location, and the task request is completed when an answer is given to that request. The electronic processor 205 may determine that an answer has been given using, for example, natural language processing of return calls the public safety officer. In another example, the electronic processor 205 may query an incident record in a computer aided dispatch system to determine that a task request has been completed.

In some embodiments, a base station is configured to propagate the temporary spectrum priority assignments to other communication devices. In one example, the electronic processor 205 receives a call request, identifying a third communication device and the first spectrum priority level, from the second communication device. In such embodiments, the electronic processor 205 is configured to establish a call having the first spectrum priority level between the second communication device and the third communication device. Similarly as described above, the electronic processor 205 temporarily assigns the third communication device a higher spectrum priority level.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for dynamically assigning spectrum priority to shared spectrum communication devices, the system comprising:
  a base station configured to be communicatively coupled to a communication network, the base station including a communication interface and an electronic processor;
  wherein the electronic processor is configured to
    receive, via the communication interface, a first call request from a first communication device, the first call request identifying a second communication device and a first spectrum priority level for the first communication device;
    establish a first call, having the first spectrum priority level, between the first communication device and the second communication device;
    determine a second spectrum priority level for the second communication device;
    when the second spectrum priority level is lower than the first spectrum priority level, transmit, to a spectrum manager configured to assign spectrum priority levels to the base station, a priority assignment request to assign the first spectrum priority level to the second communication device after the first call is terminated; and
    when a priority expiration threshold for the second communication device has been met, transmit a second priority assignment request to the spectrum manager to assign the second spectrum priority level to the second communication device.

2. The system of claim 1, wherein each of the first and second spectrum priority levels is one selected from the group consisting of an incumbent access priority level, a priority access license level, and a general authorized access level.

3. The system of claim 1, wherein the electronic processor is configured to:
  receive, via the communication interface, a second call request from the second communication device, the second call request identifying the first spectrum priority level for the second communication device; and
  when the priority expiration threshold for the second communication device has not been met, establish a second call based on the second call request and the first spectrum priority level.

4. The system of claim 3, wherein the electronic processor is configured to determine that the priority expiration threshold for the second communication device has been met when the second call is terminated.

5. The system of claim 1, wherein the electronic processor is configured to determine that the priority expiration threshold for the second communication device has been met when a priority hold timer has expired.

6. The system of claim 1, wherein
  the first call request corresponds to an incident tracked with a computer aided dispatch (CAD) system; and
  the electronic processor is configured to determine that the priority expiration threshold for the second communication device has been met when a notification, indicating that the incident has been completed, is received from the computer aided dispatch system.

7. The system of claim 1, wherein the electronic processor is configured to:
  determine conversation content of the first call using natural language processing;
  identify a task request in the conversation content; and
  determine that the priority expiration threshold for the second communication device has been met when the task request has been completed.

8. The system of claim 1, wherein
  the second communication device is communicatively coupled to one of a plurality of base stations located within a zone; and
  the priority assignment request includes a request to assign the first spectrum priority level to the plurality of base stations.

9. The system of claim 1, wherein
  the second communication device is participating in an on-premise network; and the priority assignment request includes a request to assign the first spectrum priority level to the on-premise network.

10. The system of claim 1, wherein the electronic processor is configured to:
receive, via the communication interface, a second call request from the second communication device, the second call request identifying a third communication device and the first spectrum priority level for the second communication device;
establish a second call between the second communication device and the third communication device, the second call having the first spectrum priority level;
determine a third spectrum priority level for the third communication device; and
when the third spectrum priority level is lower than the first spectrum priority level, transmit, to the spectrum manager, a second priority assignment request to assign the first spectrum priority level to the third communication device after the termination of the second call.

11. A method for dynamically assigning spectrum priority to shared spectrum communication devices, the method comprising:
receiving, via a communication interface of a base station communicatively coupled to a communication network, a first call request from a first communication device, the first call request identifying a second communication device and a first spectrum priority level for the first communication device;
establishing a first call, having the first spectrum priority level, between the first communication device and the second communication device;
determining, with an electronic processor, a second spectrum priority level for the second communication device;
when the second spectrum priority level is lower than the first spectrum priority level, transmitting, to a spectrum manager configured to assign spectrum priority levels to the base station, a priority assignment request to assign the first spectrum priority level to the second communication device after the first call is terminated; and
when a priority expiration threshold for the second communication device has been met, transmitting a second priority assignment request to the spectrum manager to assign the second spectrum priority level to the second communication device.

12. The method of claim 11, wherein each of the first and second spectrum priority levels is one selected from the group consisting of an incumbent access priority level, a priority access license level, and a general authorized access level.

13. The method of claim 11, further comprising:
receiving, via the communication interface, a second call request from the second communication device, the second call request identifying the first spectrum priority level for the second communication device; and
when the priority expiration threshold for the second communication device has not been met, establishing a second call based on the second call request and the first spectrum priority level.

14. The method of claim 13, further comprising:
determining that the priority expiration threshold for the second communication device has been met when the second call is terminated.

15. The method of claim 11, further comprising:
determining that the priority expiration threshold for the second communication device has been met when a priority hold timer has expired.

16. The method of claim 11, further comprising:
determining that the priority expiration threshold for the second communication device has been met when a notification, indicating that an incident corresponding to the first call request has been completed, is received from a computer aided dispatch system.

17. The method of claim 11, further comprising:
determining conversation content of the first call using natural language processing;
identifying a task request in the conversation content; and
determining that the priority expiration threshold for the second communication device has been met when the task request has been completed.

18. The method of claim 11, wherein
the second communication device is communicatively coupled to one of a plurality of base stations located within a zone; and
transmitting the priority assignment request to assign the first spectrum priority level to the second communication device includes transmitting a request to assign the first spectrum priority level to the plurality of base stations.

19. The method of claim 11, wherein
the second communication device is participating in an on-premise network; and
transmitting the priority assignment request to assign the first spectrum priority level to the second communication device includes transmitting a request to assign the first spectrum priority level to the on-premise network.

20. The method of claim 11, further comprising:
receiving, via the communication interface, a second call request from the second communication device, the second call request identifying a third communication device and the first spectrum priority level;
establishing a second call between the second communication device and the third communication device, the second call having the first spectrum priority level;
determining a third spectrum priority level for the third communication device;
when the third spectrum priority level is lower than the first spectrum priority level, transmitting, to the spectrum manager, a second priority assignment request to assign the first spectrum priority level to the third communication device after the termination of the second call.

* * * * *